No. 792,976.

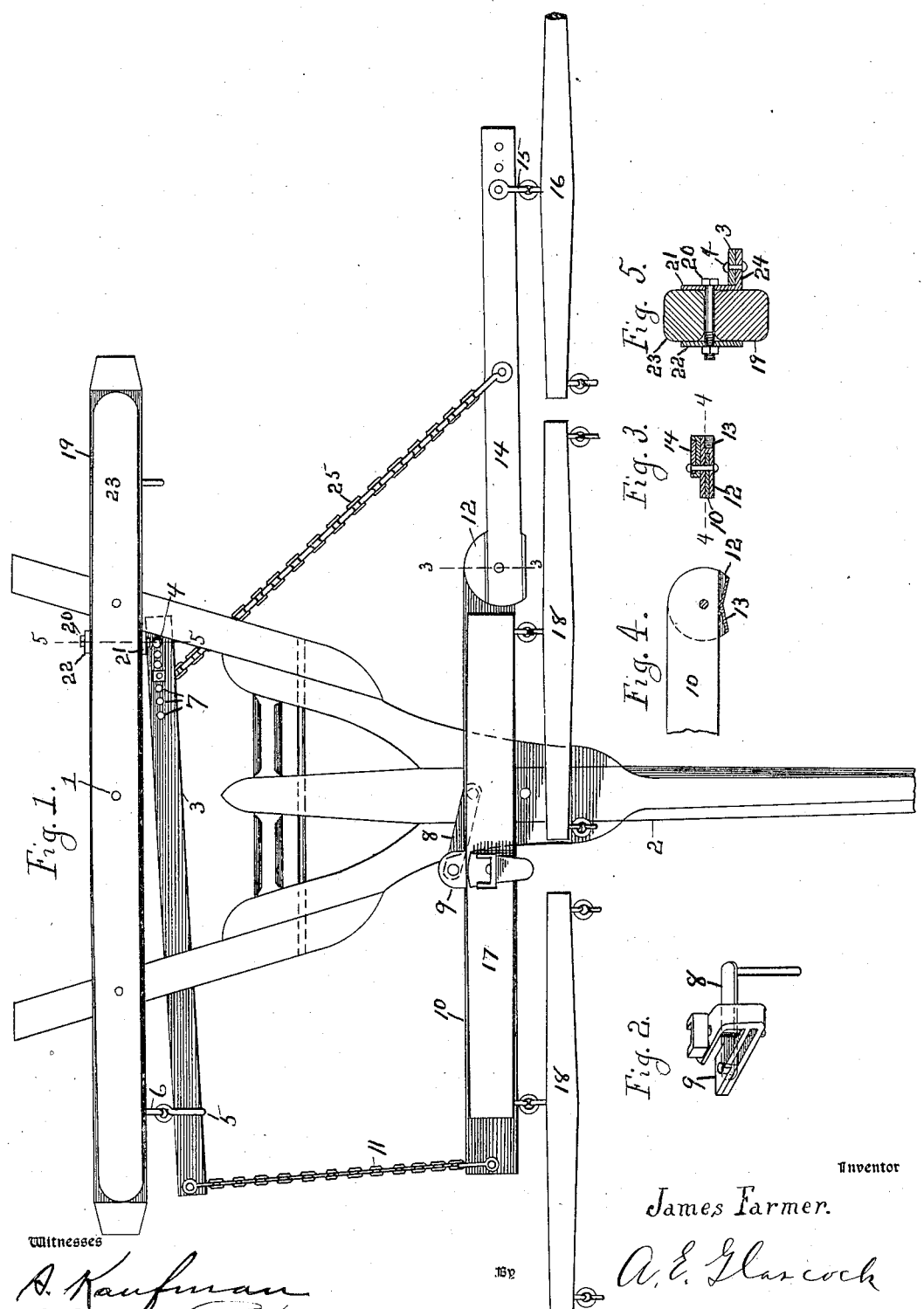

Patented June 20, 1905.

UNITED STATES PATENT OFFICE.

JAMES FARMER, OF BARRY, ILLINOIS.

DRAFT-EQUALIZER.

SPECIFICATION forming part of Letters Patent No. 792,976, dated June 20, 1905.

Application filed October 12, 1904. Serial No. 228,193.

*To all whom it may concern:*

Be it known that I, JAMES FARMER, a citizen of the United States, residing at Barry, in the county of Pike and State of Illinois, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has relation to draft-equalizers; and it consists in the novel construction and arrangement of its parts, as hereinafter described.

The object of the invention is to provide a draft-equalizer adapted to have three horses hitched thereto and to be used on farm-wagons, reapers, mowers, &c.

The special object of the invention is to provide such a draft-equalizer having its equalizing parts vertically arranged, whereby space may be saved and the draft-animals may be hitched nearer to the object to be drawn.

The equalizer consists, primarily, of a draft-bar, which is attached to the forward axle of the vehicle and extends substantially parallel with the same across the line of draft, the said draft-bar extending across the line of the draft on one side for a greater distance than on the other side. The tongue is provided with a crank-pin, to which is fulcrumed an iron which receives a lever, the intermediate portion of the crank-pin extending out upon the tongue in substantially the same direction as the outer end of the draft-bar above referred to. One end of said draft-lever is connected, by means of a link or chain, with the outer end of the draft-bar, and a supplementary draft-lever is fulcrumed to the opposite end of the first-said draft-lever and is connected, by means of a link or chain attached at its middle, with the other end of said draft-bar. The supplementary draft-lever is located vertically above the first-said draft-lever and is not located in front of the same, as shown and described in my prior patent, No. 752,966. Consequently space is economized and the animal attached to the said supplementary draft-lever is brought nearer the vehicle.

A doubletree is pivoted in the iron that receives the first-said draft-lever, and said doubletree at each end carries a swingletree. The said doubletree is also located above the first-said draft-lever and not in front of the same, for the purpose of economizing space and arranging all of the swingletrees to which the animals are attached substantially in alinement with each other. The connection between the draft-lever and supplementary draft-lever is such as to permit necessary oscillation of the two members at that point and at the same time limit the oscillatory movement of both.

In the accompanying drawings, Figure 1 is a top plan view of the draft-equalizer. Fig. 2 is a perspective view of the pivoted iron for supporting the draft-lever and doubletree. Fig. 3 is a vertical sectional view of the connection between the draft-lever and supplementary draft-lever cut on the line 3 3 of Fig. 1. Fig. 4 is a horizontal sectional view of the connection, as shown in Fig. 3, cut on the line 4 4 thereof. Fig. 5 is a vertical sectional view on the line 5 5 of Fig. 1, showing the method of attaching the draft-bar to the axle.

Treating a line drawn from the king-bolt perforation 1 through the longitudinal axis of the tongue 2 as the line of draft, the draft-bar 3 extends substantially transversely across said line of draft and is secured at one end at the point 4. The opposite end of said bar passes through the link 5, which is adapted to the draft-hook 6, the distance from the line of draft to the point 4 being substantially one-half of the distance from the said line of draft to the opposite end of the draft-bar. One end of said draft-bar is provided with a number of perforations 7, by means of which the attaching-point 4 may be so adjusted as to accommodate the said draft-bar to different vehicles that differ in width or length of axle. Said perforations may also be used for the purpose of holding a hook securing the rear end of the connection between said draft-bar and the supplemental draft-lever, as will be hereinafter explained. They also afford a means for adjusting the securing-point of the rear end of said connection.

A crank-pin 8 is pivoted at one end in the line of draft, and its opposite end extends laterally in substantially the same direction as the longer end of the draft-bar 3. The iron 9 is pivoted to the extended end of the crank-pin 8. Said iron receives the draft-lever 10, which is held therein against rotation with relation to said iron. The chain 11 connects one end of the lever 10 with the longer end of the draft-bar 3. The opposite portion of said draft-lever 10 extends across the tongue 2 and is provided at its end with the plate 12, which is pivotally attached thereto. The forward edge of said plate is provided with the angular flange 13, the apex of which is just in front of the forward edge of the draft-bar 10. Said flange is adapted to limit the oscillatory movement of the draft-bar 10 and the supplemental draft-bar. The supplemental draft-lever 14 is secured at its end to the plate 12, and the said plate oscillates with the draft-lever 14. The extreme outer end of the lever 14 is provided with an adjustable clevis 15, which supports a swingletree 16. The doubletree 17 is pivoted in the iron 9 and is adapted to have an oscillatory movement with relation thereto. One end of said doubletree 17 extends across the tongue 2, and the said doubletree is provided at each end with suitable clevises, which carry the swingletrees 18 18. It will be observed that the doubletree 17 is vertically arranged with relation to the draft-lever 10 for the purpose of economizing space, as above described.

By referring to Fig. 5 the detailed construction is shown whereby the end of the draft-bar 3 is pivotally attached to the axle 19. The bolt 20 passes through perforations in the plates 21 and 22, which are located upon opposite sides of the axle. Said bolt 20 also passes between the axle 19 and the bolster 23. The plate 21 is provided at its lower end with the horizontal flange 24, which receives the lower end of the pivot 4 and supports the bar 3.

Having described my invention, what I claim as new, and desire to secure by Letters Patent, is—

1. A draft-equalizer consisting of a draft-lever pivoted to a tongue, a connection connecting one end of said draft-lever with the vehicle, a supplemental draft-lever pivotally attached to the first said draft-lever and having a plate with an angular forward edge the apex of which is located in front of the forward edge of the first said draft-lever, and a connection between said supplemental draft-lever and the vehicle.

2. A draft-equalizer consisting of a draft-lever pivoted at its rear edge to a tongue, a tree located above said draft-lever and pivotally attached to the same, the pivotal points of the tree and lever being in alinement with each other in the line of draft, but out of alinement vertically, and suitable connections between the draft-lever and the vehicle.

In testimony whereof I affix my signature in presence of two witnesses.

JAMES FARMER.

Witnesses:
J. W. BOWER,
E. L. PENNER.